US008749619B2

(12) United States Patent
Kirmani et al.

(10) Patent No.: US 8,749,619 B2
(45) Date of Patent: Jun. 10, 2014

(54) METHODS AND APPARATUS FOR TRANSIENT LIGHT IMAGING

(75) Inventors: Ahmed Kirmani, Cambridge, MA (US); Ramesh Raskar, Cambridge, MA (US); James Davis, Los Gatos, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 526 days.

(21) Appl. No.: 12/893,863

(22) Filed: Sep. 29, 2010

(65) Prior Publication Data

US 2012/0075423 A1    Mar. 29, 2012

(51) Int. Cl.
| | |
|---|---|
| *H04N 15/00* | (2006.01) |
| *G01S 7/481* | (2006.01) |
| *G01S 7/486* | (2006.01) |
| *G01S 17/89* | (2006.01) |
| *H04N 3/02* | (2006.01) |
| *H04N 5/225* | (2006.01) |

(52) U.S. Cl.
CPC .............. *G01S 7/481* (2013.01); *G01S 7/4865* (2013.01); *G01S 17/89* (2013.01); *H04N 3/02* (2013.01); *H04N 5/2256* (2013.01)
USPC .................................... 348/46; 348/E15.001

(58) Field of Classification Search
CPC ....... G01S 7/481; G01S 7/4865; G01S 17/89; H04N 3/02; H04N 5/2256
USPC ........................................................... 348/46
See application file for complete search history.

(56) References Cited

PUBLICATIONS

Titled "5d time-light transport matrix: What can we reason about scene properties?", authors Ramesh Raskar and James Davis, published in 2008.*
Titled "Flash Lidar Based on Multiple-Slit Streak Tube Imaging Lidar", authors—Asher Gelbart, Brian C. Redman, and others, published in 2002.*
Titled "Frequency Analysis of Transient Light Transport with Applications in Bare Sensor Imaging", authors Di Wu et al., MIT Media Lab.*
Titled "Recovering Three-dimensional Shape Around a Corner using Ultrafast Time-of-Flight Imaging", authors Andrea Veltens et al., MIT Media Lab.*
Seitz, S., Matsushita, Y., Kutulakos, K, A theory of inverse light transport, Proc. of IEEE ICCV (2005), vol. 2, pp. 1440-1447, 2005.

* cited by examiner

*Primary Examiner* — Mehrdad Dastouri
*Assistant Examiner* — Nguyen Truong
(74) *Attorney, Agent, or Firm* — Stephen R. Otis (57) ABSTRACT

In illustrative implementations of this invention, multi-path analysis of transient illumination is used to reconstruct scene geometry, even of objects that are occluded from the camera. An ultrafast camera system is used. It comprises a photo-sensor (e.g., accurate in the picosecond range), a pulsed illumination source (e.g. a femtosecond laser) and a processor. The camera emits a very brief light pulse that strikes a surface and bounces. Depending on the path taken, part of the light may return to the camera after one, two, three or more bounces. The photo-sensor captures the returning light bounces in a three-dimensional time image I(x,y,t) for each pixel. The camera takes different angular samples from the same viewpoint, recording a five-dimensional STIR (Space Time Impulse Response). A processor analyzes onset information in the STIR to estimate pairwise distances between patches in the scene, and then employs isometric embedding to estimate patch coordinates.

18 Claims, 10 Drawing Sheets

METHODS AND APPARATUS FOR TRANSIENT LIGHT IMAGING

STATEMENT REGARDING FEDERALLY SPONSORED RESEARCH OR DEVELOPMENT

This invention was made with U.S. government support under Grant Number CCF-0746690, awarded by the National Science Foundation. The government has certain rights in this invention.

FIELD OF THE TECHNOLOGY

The present invention relates generally to cameras.

SUMMARY

In illustrative implementations of this invention, multi-path analysis of transient illumination is used to reconstruct scene geometry, even of objects that are occluded from a camera.

In these illustrative implementations, an ultrafast camera system is used. The system comprises a photo sensor, a pulse laser and a processor. For example, in some cases the photo sensor has an exposure time of 50 picoseconds and the laser emits pulses with a duration of 50 femtoseconds.

The laser emits an impulse ray in a certain direction specified by angles ($\theta$, $\phi$). The ray strikes a surface in the scene, and bounces. Depending on the path taken, part of the light may return to the camera after one, two, three or more bounces.

The photo sensor has such a fast exposure time that it can capture changes in light intensity as these different bounces come back to the camera. The photo sensor takes time samples of the light bouncing back to the camera. For each impulse ray with angle ($\theta$, $\phi$), a time image is recorded of the changing intensity of light. Specifically, for each impulse ray, the photo sensor captures a 3D time image $I(x_i, y_i, t)$, where I is the incoming irradiance sampled at times t and pixel positions $x_i$, $y_i$.

The camera is rotated. This changes the angle of the impulse ray, but the camera otherwise remains in the same position relative to the scene. Multiple samples at different angles ($\theta$, $\phi$) are taken. Thus, the photo sensor records a five dimensional STIR (Space Time Impulse Response) of the scene, with the five dimensions being time t, the x, y pixel position, and the angles ($\theta$, $\phi$) of the impulse ray.

The processor analyzes the STIR to reconstruct geometric and photometric properties of the scene, including portions of the scene that are occluded from the camera. Thus, for example, the camera can be used to "look around a corner". For example, the camera may be pointed so that impulse rays bounce off a diffuse surface (such as a wall or open door) into a room that is hidden from direct view of the camera. Then the light that bounces back out of the room indirectly to the camera may be analyzed to reconstruct the geometry of objects in that hidden room.

A "patch" means a small planar facet in a scene. One can consider a scene to be comprised of many patches.

To reconstruct the geometry of a scene, the processor uses onset information contained in the STIR to estimate pairwise distances between various patches in the scene. The processor then uses isometric embedding to estimate patch coordinates.

The spatial resolution of the reconstruction may be increased by increasing the number of angular samples taken. For example, if samples are taken at 20 different angles (each angle being specified by a different ($\theta$, $\phi$)), this yields a higher spatial resolution than if only three different angular samples are taken, other things being equal.

Decreasing the temporal resolution of the photo sensor tends to decrease the spatial resolution of the reconstruction. For example, exposure times in the microsecond range will yield a lower spatial resolution than exposure times in the picosecond range, other things being equal. However, one can compensate for slower temporal resolution by increasing the number of angular samples.

According to principles of this invention, a global light transport model may be used to analyze transient illumination, in order to reconstruct geometric and photometric properties of a scene.

It is helpful to briefly contrast the present invention with two existing technologies:

LIDAR (Light Detection and Ranging) systems modulate light, typically on the order of nanoseconds, and measure the phase of the reflected signal to determine depth. Thus, LIDAR involves time sampling. However, LIDAR only analyzes first bounces. Unlike the present invention, LIDAR does not analyze multi-bounce information, such as information about second and third bounces, in order to estimate scene geometry.

Also, Seitz et al. have decomposed steady-state images into multi-bounce components under the assumption that i surface is Lambertian. [S. M. Seitz, Y. Matsushita, K. N. Kutulakos, 2005, "A Theory of Inverse Light Transport", in Proc. of ICCV, II: 1440-1447] Thus, Seitz et al. have performed multi-bounce analysis. But they have done so for steady-state light transport, assuming an equilibrium in global illumination. This is quite different from the present invention, which analyzes transient illumination, where light is changing.

The above description of the present invention is just a summary. It is intended only to give a general introduction to some illustrative implementations of this invention. It does not describe all of the details of this invention. This invention may be implemented in many other ways.

The above Figures illustrate some illustrative implementations of this invention, or provide information that relates to those implementations. However, this invention may be implemented in many other ways. The above Figures do not show all of the details of this invention.

DETAILED DESCRIPTION

Figure 1:
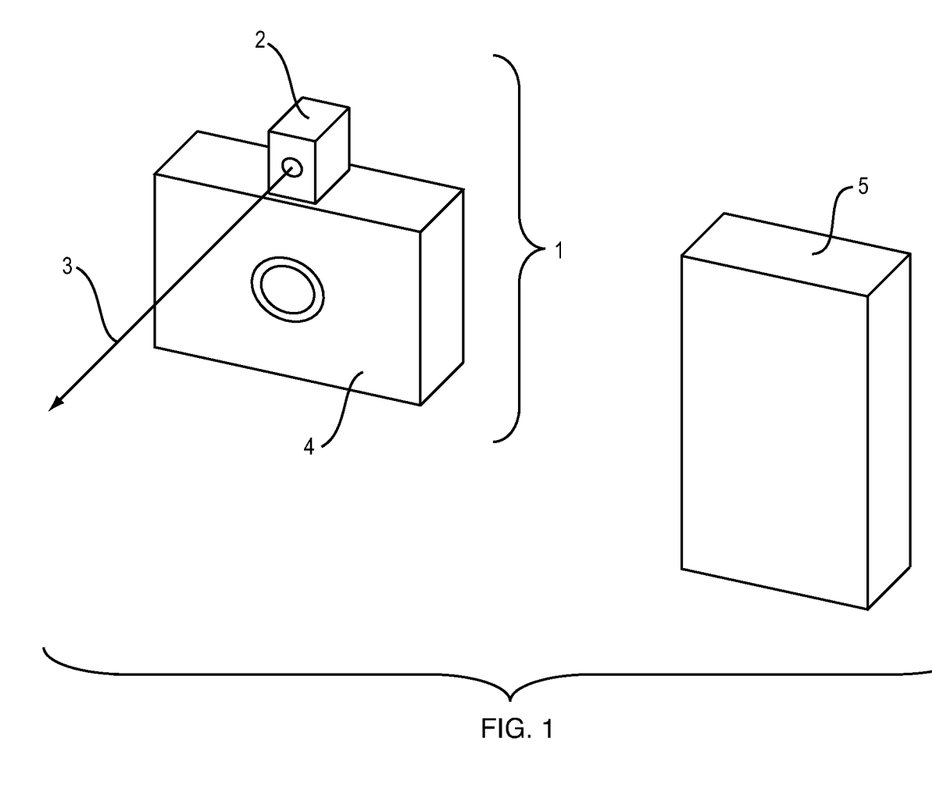
FIG. 1 is a diagram showing a camera system, in an illustrative implementation of this invention.

FIG. 1 is a diagram of ultrafast camera system, in an illustrative embodiment of this invention. A camera 1 comprises a pulse laser 2 and a directionally sensitive sensor 4. The sensor is comprised of an array of photo sensors. The laser 2 is adapted to emit impulse rays 3. In the example shown in FIG. 1, the photo sensor has an exposure time of 50 picoseconds (approximately the time it takes light to travel about 1.5 cm of free space). Also, in that example, the laser emits pulses with a duration of about 50 femtoseconds.

Figure 2:
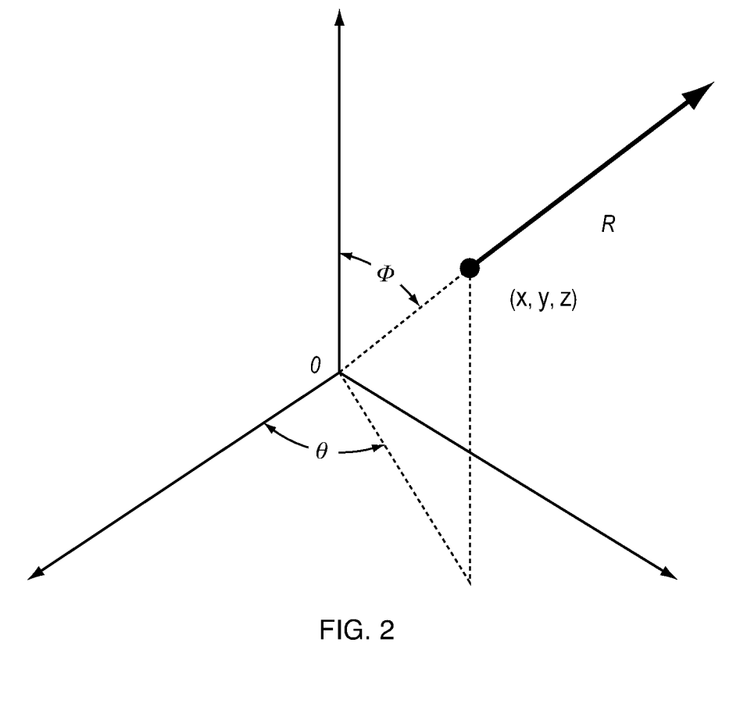
FIG. 2 shows a light ray, whose direction is described by angles $\theta$ and $\phi$.

FIG. 2 illustrates how two angles ($\theta$, $\phi$) may be used to specify the direction of a light ray.

Figure 3:
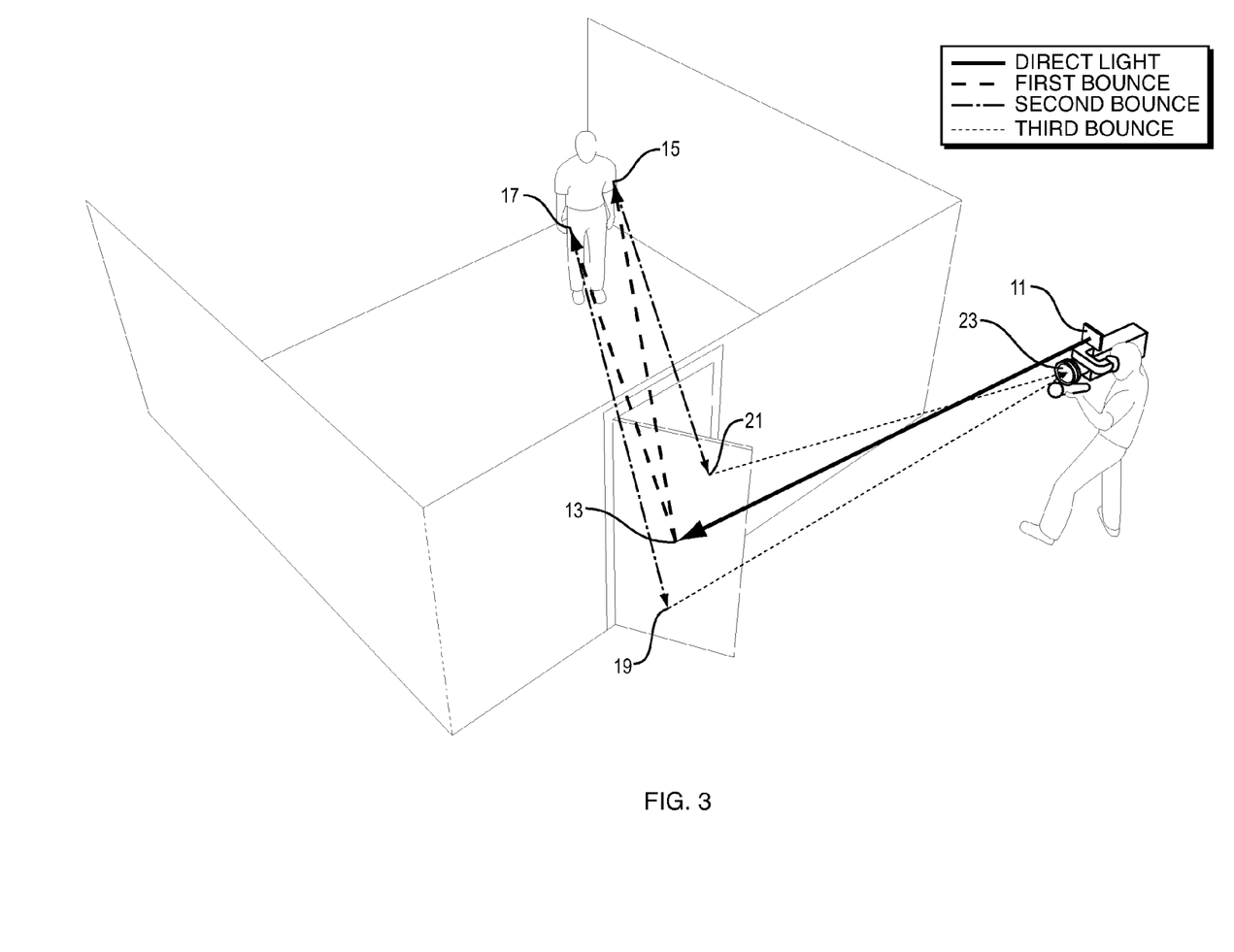
FIG. 3 shows an illustrative implementation of this invention, in which light is being emitted by a pulsed illumination source in a camera and then some of that light is bouncing three times: first, into a hidden room; second, back out of the room; and third, back to the camera.

FIG. 3 shows an example of how this invention may be used to "see around a corner", even in the absence of a mirror. A pulsed illumination source 11 emits very short pulses. Some of the light bounces as follows: first, into a hidden room; second, back out of the room; and third, back to the camera. Thus, in FIG. 3, light is emitted from the illumination source 11. Some of that light travels directly to a point 13 on a door (a diffuse surface), and then bounces. On a first bounce, some of that light travels from point 13 to points 15 and 17 (which are located on a person in a hidden room). On a second bounce, some of the light travels from points 15 and 17 to points 19 and 21 (on the door). On a third bounce, some of the light travels from point 19 and 21 to a photo sensor 23.

According to principles of this invention, a global light transport model may be used to analyze transient illumination.

In this model, light interacts with a scene as follows: Incident illumination causes the first bounce. This direct bounce is followed by a complex pattern of inter-reflections whose dynamics are governed by the scene geometry and material properties of the scene elements. At any time instant an observer sees only a projection of the complete set of scene light rays. This projection comprises only the rays that are directed towards the observer.

Consider a scene S composed of M small planar facets $p_1, \ldots p_M$ with 3D positions $z_i \in R^3$. Let $Z=[z_1, \ldots, z_M]$. Define relative visibility between patches, $v_{ij}=v_{ji}=0$ or 1 depending on whether or not patch $p_i$ is occluded from $p_j$. Let $D=[d_{ij}]$ be the Euclidean distance matrix containing pairwise distances. For analytical convenience, consider the photo sensor (observer) and illumination (source) as a single patch denoted by $p_0$. It is straightforward to extend the following analysis to include multiple sources and the photo sensor at an arbitrary position in the scene. Assume that the scene is static and material properties are constant over sub-nanosecond imaging intervals.

In this model, each sensor pixel observes a unique patch in the scene. It also continuously time samples the incoming irradiance, creating a 3D time image, $I(x_i, y_i, t)$. The pixel at sensor position ($x_i$, $y_i$) observes the patch $p_i$ overtime. The pulsed illumination source generates arbitrarily short duration and directional impulse rays. The direction of an impulse ray aimed at patch $p_i$ is specified by ($\theta$, $\phi$). The sensor and illumination are synchronized for precise measurement of Time Difference of Arrival (TDOA).

The Space Time Impulse Response (STIR) of the scene S denoted by STIR(S) is a collection of time images, each captured with an impulse ray illuminating a single scene patch $p_j$. This is a 5D function: STIR($x_i$, $y_i$, $\theta_j$, $\phi_j$, t).

According to principles of this invention, a STIR may be measured as follows: First, illuminate patch $p_j$ with an impulse ray ($\theta_j$, $\phi_j$). Second, for that impulse ray, record a 3D time image $I(x_i, y_i, t)$, where I is the incoming irradiance sampled at times t and pixel positions $x_i$, $y_i$. Third, take multiple angular samples at different angles ($\theta$, $\phi$) To take these multiple angular samples, rotate the camera to change the angle of the impulse ray (but otherwise keep the camera in the same position relative to the scene) and for each angle, repeat the first and second steps.

Thus, in an illustrative implementation of this invention, a photo sensor captures a five dimensional STIR (Space Time Impulse Response) of the scene, with the five dimensions being time t, the x, y pixel position, and the angles ($\theta$, $\phi$) of the impulse ray.

Figure 4:
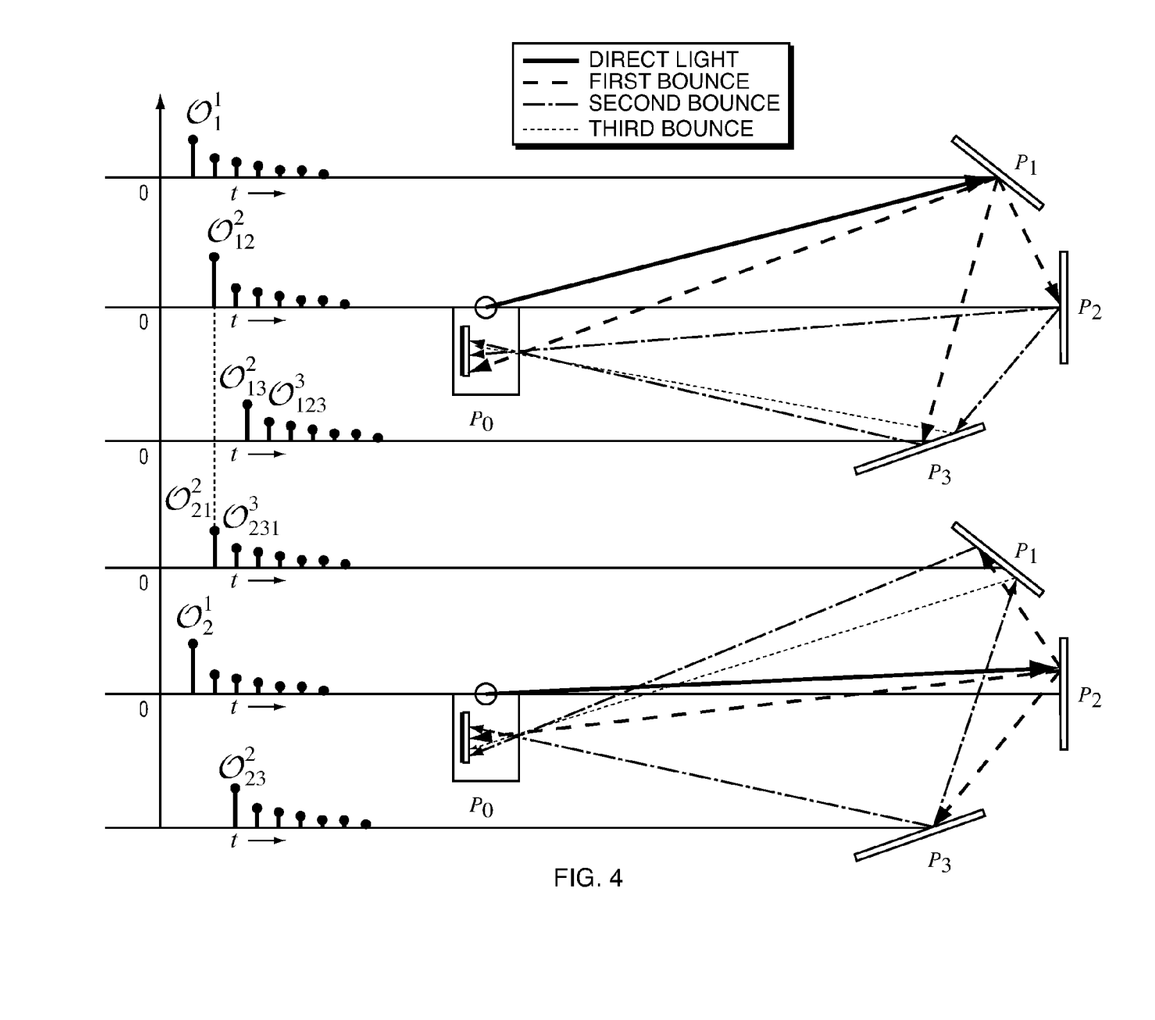
FIG. 4 illustrates how a Space Time Impulse Response (STIR) may be recorded for a scene that comprises three patches, in an illustrative implementation of this invention.

FIG. 4 illustrates how a STIR may be recorded for a scene that comprises three patches, according to principles of this invention.

In the upper light ray diagram in FIG. 4 (on the upper right side of FIG. 4), the femtoprojector is pointed at, and directly illuminates, patch $p_1$. Some of the light bounces directly back to the camera at patch $p_0$ on the first bounce, following the path $p_0 \rightarrow p_1 \rightarrow p_0$. Some of the light returns to the camera at patch $p_0$ in two bounces, following the paths $p_0 \rightarrow p_1 \rightarrow p_2 \rightarrow p_0$ and $p_0 \rightarrow p_1 \rightarrow p_3 \rightarrow p_0$ respectively. Some of the light returns to the camera at patch $p_0$ in three bounces, following the path $p_0 \rightarrow p_1 \rightarrow p_2 \rightarrow p_3 \rightarrow p_0$. As used herein, a "multi-path" means a path in which light leaves from the camera and returns to the camera after two or more bounces.

In the lower light ray diagram in FIG. 4 (on the lower right side of FIG. 4), the femtoprojector is pointed at, and directly illuminates, patch $p_2$. Some of the light bounces directly back to the camera at patch $p_0$ on the first bounce, following the path $p_0 \rightarrow p_2 \rightarrow p_0$. Some of the light returns to the camera sensor at patch $p_0$ in two bounces, following the paths $p_0 \rightarrow p_2 \rightarrow p_1 \rightarrow p_0$ and $p_0$ $p_2 \rightarrow p_3 \rightarrow p_0$, respectively. Some of the light returns to the camera at patch $p_o$ in three bounces, following the path $p_0 \rightarrow p_2 \rightarrow p_3 \rightarrow p_1 \rightarrow p_0$.

Thus, the two different light ray diagrams in FIG. 4 represent two different angular samples of the same scene (i.e., samples in which the direction of the impulse ray differs).

Some terminology: An "onset" is a non-zero response detected at a particular pixel sensor when light returns to the camera after following a particular path and number of bounces. A "first onset" is an onset for light returning to the camera after one bounce. A "second onset" is an onset for light returning to the camera after two bounces. A "third onset" is an onset for light returning to the camera after three bounces. For purposes of this discussion, an onset is denoted as follows: A superscript indicates the number of bounces that it took for the light to return to the camera. A subscript indicates the path that the light took to return. Thus, for example, $O_{123}^3$ denotes a third onset, where the light returned to the camera at patch $p_0$ in three bounces, following the path $p_0 \rightarrow p_1 \rightarrow p_2 \rightarrow p_3 \rightarrow p_0$ In FIG. 4, there are six graphs on the left. Each graph shows onsets recorded over time at a particular sensor pixel. In each, the horizontal axis represents time. The upper three graphs are for one angular sample (in which the projector is pointed at patch $p_1$) and the lower three graphs are for a different angular sample (in which the projector is pointed at patch $p_2$).

In FIG. 4, the upper three graphs show onsets recorded while the projector is pointed at, and directly illuminates, patch $p_1$. The top graph is for onsets recorded at the sensor pixel that observes patch $p_1$. The second-from-the-top graph is for the onsets recorded at the pixel that observes patch $p_2$. The third-from-the-top graph is for the pixel that observes patch $p_3$.

In FIG. 4, the lower three graphs show onsets recorded while the projector is pointed at, and directly illuminates, patch $p_2$. The third-from-the bottom graph is for onsets recorded at the sensor pixel that observes patch $p_1$. The second-from-the-bottom graph is for the onsets recorded at the pixel that observes patch $p_2$. The bottom graph is for the pixel that observes patch $p_3$.

Thus, for example, in the third-from-the-bottom graph on the left of FIG. 4, the earliest onset that is recorded is $O_{21}{}^2$ (recorded when light returns after two bounces, after following the path $p_0 \rightarrow p_2 \rightarrow p_1 \rightarrow p_0$) and the next onset that is recorded is $O_{231}{}^3$ (recorded when light returns after three bounces, after following the path $p_0 \rightarrow p_2 \rightarrow p_3 \rightarrow p_1 \rightarrow p_0$).

In FIG. 4, each graph on the left is a time image of onsets recorded at a particular sensor for a particular impulse ray direction $(\theta_j, \phi_j)$ The collection of all of these time images constitutes a 5D function, $STIR(x_i, y_i, \theta_j, \phi_j, t)$, with the five dimensions being time t, the x, y pixel position, and the angles $(\theta, \phi)$ of the impulse ray.

In illustrative implementations of this invention, the direct distances, $d_{0i}$, are calculated, using the first bounce, and the pairwise distances, $d_{ij}$ between patches are also calculated. Second and higher order bounces are used to estimate scene geometry. First, the onset information contained in the STIR is used to estimate pairwise distances. Then an isometric embedding is computed to determine patch coordinates.

In some implementations of this invention, the following two strict assumptions are used to model a scene in which all of patches are visible to each other and all of the patches are diffuse reflectors: (1) Each patch is visible from all the other patches ($v_{ij}=1, \forall i, j$). If not, then a set of patches for which this is true is imaged locally. (2) The reflectance of each patch $p_i$ has a non-zero diffuse component. This assumption ensures that direct distances $d_{0i}$ can be estimated.

In an illustrative implementation of this invention, distances may be estimated from a STIR as follows:

Define $\mathcal{O}^1, \ldots, \{O_i^1 | i=1, \ldots M\}$ as the set of first onsets: the collection of all time instants, $O_i^1$, when the pixel observing patch $p_i$ receives the first non-zero response while the source illuminates the same patch $p_i$. $O_i^1$ is the time taken by the impulse ray originating at $p_0$ directed towards $p_i$ to arrive back at $p_0$ after the first bounce; this corresponds to the direct path $p_0 \rightarrow p_i \rightarrow p_0$. Similarly, define $\mathcal{O}^2 = \{O_{ij}^2 | i, j=1, \ldots M; j \neq i\}$ as the set of second onsets: the collection of times when the transient imaging camera receives the first non-zero response from a patch $p_i$ while illuminating a different patch $p_j$. This corresponds to the multi-path $p_0 \rightarrow p_j \rightarrow p_i \rightarrow p_0$. $O_{ij}^2 = O_{ji}^2$. It is straightforward to label the onsets in $\mathcal{O}^1$ and $\mathcal{O}^2$ because they correspond to the first non-zero responses in STIR time images. In order to compute D using $\mathcal{O}^1$ and $\mathcal{O}^2$, construct the forward distance transform, $T_2$, of size (M(M+1)/2×M(M+1)/2) which models the sum of appropriate combinations of path lengths contained in the distance vector d=vec(D) and relates it to the vector of observed onsets O. Then solve the linear system $T_2 d = O$ to obtain distance estimates $\hat{d}$.

As an example, consider a scene with 3 patches (M=3) as shown in FIG. 4. According to principles of this invention, the linear system for the scene in FIG. 4 may be constructed as:

$$\begin{bmatrix} 2 & 0 & 0 & 0 & 0 & 0 \\ 1 & 1 & 0 & 1 & 0 & 0 \\ 1 & 0 & 1 & 0 & 0 & 1 \\ \hline 0 & 0 & 0 & 2 & 0 \\ 0 & 0 & 1 & 1 & 1 & 0 \\ 0 & 0 & 0 & 0 & 0 & 2 \end{bmatrix} \begin{bmatrix} d_{01} \\ d_{12} \\ d_{13} \\ \hline d_{02} \\ d_{23} \\ d_{03} \end{bmatrix} = c \begin{bmatrix} O_1^1 \\ O_{12}^2 \\ O_{13}^2 \\ \hline O_1^2 \\ O_{23}^2 \\ O_1^3 \end{bmatrix}$$

For any M, matrix $T_2$ is full rank and well-conditioned. Due to synchronization errors, device delays and response times the observed onsets have measurement uncertainties which introduce errors in distance estimates. The redundancy in second onset values ($O_{ij}{}^2 = O_{ji}{}^2$) may be used to obtain multiple estimates, $\hat{d}$, and to reduce error by averaging them.

The problem of estimating scene structure, Z, from pairwise distance estimates, D, is equivalent to finding an isometric embedding $\hat{Z} \subset R^{M \times 3} \rightarrow R^3$. For computational convenience, $p_0$ is taken to be the origin ($z_0=(0,0,0)$). According to principles of this invention, scene structure may be recovered from noisy distance estimates using the isometric embedding algorithm set forth below. The estimated coordinates, $\hat{Z}$, may be used iteratively to recompute robust distance estimates. As is well known in the art [J Dattaro, "Convex optimization and euclidean distance geometry", Meboo Publishing USA], convex optimization may be used to compute optimal embeddings in the presence of distance uncertainties.

In an illustrative implementation of this invention, the following isometric embedding algorithm is used:

1. Compute $h_{ij} = \frac{1}{2}(d_{0i}{}^2 + d_{0j}{}^2 - d_{ij}{}^2)$. Construct Gram matrix $H_{M \times M} = [h_{ij}]$
2. Compute the SVD of $H = U \Sigma V^T$
3. Pick 3 largest eigenvalue-vectors $\Sigma_3{}^{3 \times 3}, U_3{}^{M \times 3}, V_3{}^{3 \times M}$
4. Compute embedding $Z_e = (\Sigma_3)^{1/2} V_3$
5. Rotate and translate to align $\hat{Z} = R Z_e + T$ According to principles of this invention, a transient imaging model may be applied to scenes comprising patches hidden from the camera and illumination. Consider a scene that contains a set of patches (say H) hidden from both the camera and the source. Hidden surface estimation may be viewed as two sub-problems: (1) labeling third onsets and (2) inferring distances to hidden patches from integrated path lengths.

In some implementations of this invention, the following three strong assumptions are used to estimate the structures of hidden patches: (1) The number of hidden patches is known or assumed. (2) All third bounces arrive before fourth and higher order bounces. (3) No two or more distinct third bounces arrive at the same time in the same time profile $STIR(x_i, y_i, \theta_j, \phi_j, t=0 \ldots T)$.

The second assumption is true for scenes that have no inter-reflection amongst hidden patches. The third assumption is generally valid because STIR is measured one patch at a time. If a patch, $p_i$, is hidden from $p_0$, then the first and second onsets involving $p_i$ cannot be observed, i.e. the vector of distances $d_H = [d_{ij}]:p_i \in H, j=0, \ldots M$ cannot be estimated using just $\mathcal{O}^1$ and $\mathcal{O}^2$. Hence, the set of third onsets, $\mathcal{O}^3 = \{O_{ijk}{}^3: i, j, k=1, \ldots, M; i \neq j; j \neq k\}$, that corresponds to third bounces, is considered.

Note that there are O(M) first onsets, $O(M^2)$ second onsets and $O(M^3)$ third onsets. This invention may be implemented in such a way that, if a hidden patch has at most N inter-reflections with the other hidden patches, then onsets that correspond to up to (N+3) bounces (i.e. the sets $\mathcal{O}^1, \mathcal{O}^2, \ldots \mathcal{O}^{N+3}$) are used. Also, Euclidean geometry imposes that $O_{ijk}{}^3 = O_{kji}{}^3$.

Figure 5:
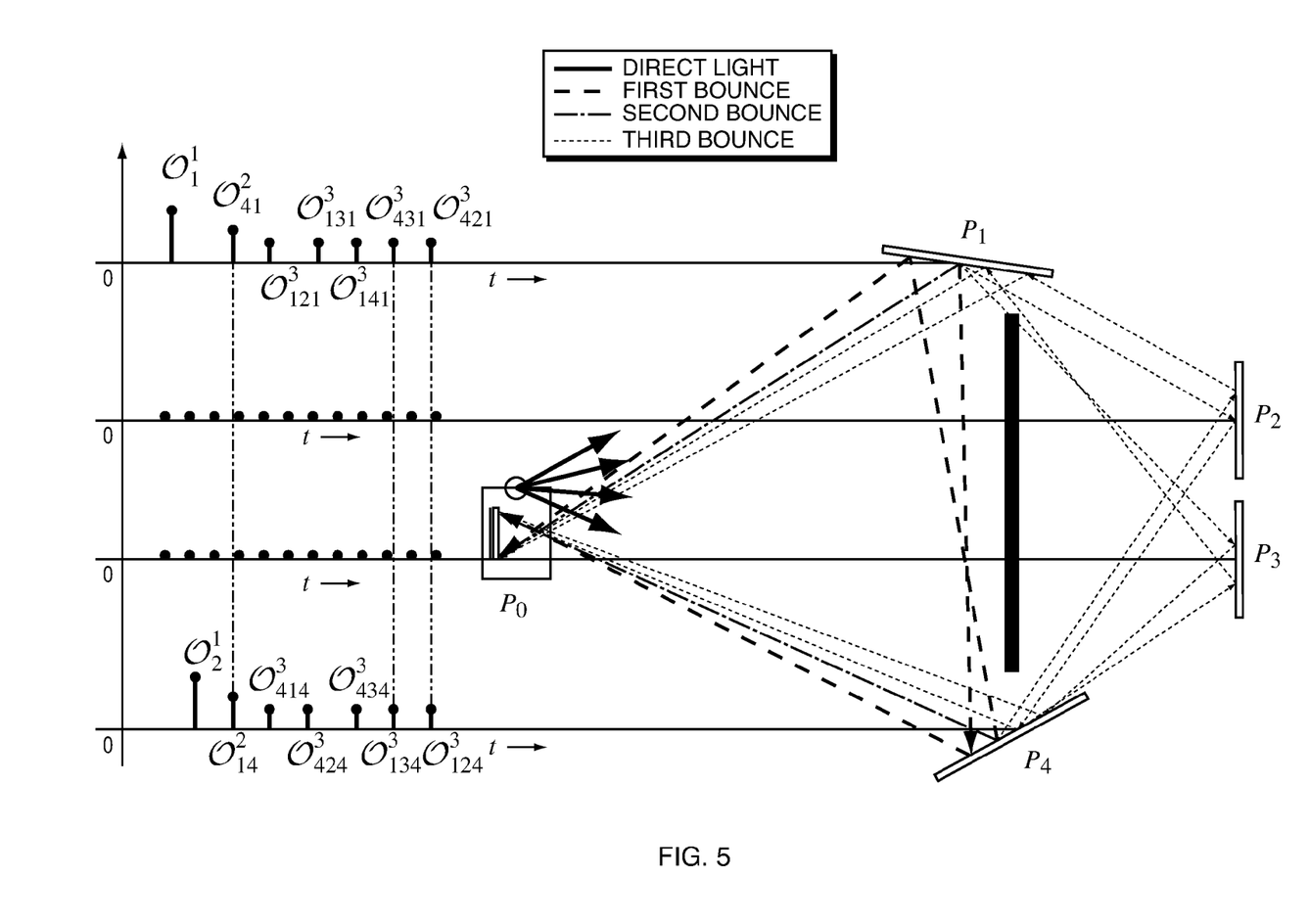
FIG. 5 illustrates how a STIR may be recorded for a scene that comprises four patches, where two of the patches are occluded from direct view of the camera, in an illustrative implementation of this invention.

In illustrative implementations of this invention, labeling the onsets contained in $\mathcal{O}^3$ is non-trivial. For example, consider the scene in FIG. 5. In FIG. 5, patches $p_2$ and $p_3$ are hidden. First, compute the distances involving visible patches, $d_{01}$, $d_{04}$, $d_{14}$, in the manner described above. The distances $(d_{21}, d_{24})$ and $(d_{31}, d_{34})$ are not directly observable. Once these distances are estimated, $d_{02}$, $d_{in}$ and $d_{23}$ can be computed using multilateration. Next, third onsets in FIG. 5 are identified. The onsets $O_{141}{}^3$ and $O_{414}{}^3$ in FIG. 5 are readily labeled using TDOA, since the distances to patch $p_1$ and $p_4$ are known. The onsets $O_{121}{}^3$, $O_{131}{}^3$, $O_{424}{}^3$, $O_{434}{}^3$, $O_{124}{}^3$, $O_{134}{}^3$, $O_{421}{}^3$, $O_{431}{}^3$ in FIG. 5 are disambiguated using the facts that $O_{421}{}^3 = O_{124}{}^3$, $O_{431}{}^3 = O_{134}{}^3$ and the onsets arrive in different time profiles of the STIR(S). The remaining onsets are sorted based on their arrival times and labeled based on the a priori assumption of the proximity of hidden patches to visible patches. In this example, the assumption is made that $p_2$ is closer to $p_1$ than $p_3$. Hence, the onset $O_{121}{}^3$ arrives earlier than $O_{131}{}^3$.

In illustrative implementations of this invention, the following labeling algorithm may be used for multiple hidden patches: (Step 1) Estimate the distances to all the visible scene patches and use the arrival times to label all third bounce onsets corresponding to visible geometry. (Step 2) Fix an arbitrary ordering of hidden patches based on their proximity to some visible patch. (Step 3) Use arrival times to identify the third onset pairs corresponding to same path length $(O_{ijk}{}^3 = O_{kji}{}^3)$. Label them with the ordering of step 2. (Step 4) Sort the remaining onsets according to their arrival times and use step 2 ordering to label them.

In illustrative implementations of this invention, a distance operator, $T_3$, is constructed that relates third bounces arrival times involving hidden patches, $O_H$, and the distances to the hidden patches, $d_H$. The resulting linear system $T_3 d_H = O_H$ is solved to obtain the complete distance set, D. The scene structure, Z, is then estimated.

FIG. 5 shows an example of a scene with 4 patches (M=4). In FIG. 5, patches $p_2$ and $p_3$ are hidden. The first and second onsets are a result of directly observing visible patches $p_1$ and $p_4$. The pattern of arrival of third onsets depends on the relative distance of the hidden patches $p_2$ and $p_3$ from the visible patches. The onsets that correspond to light traversing the same Euclidean distance are readily identified. Once the onsets are labeled, they may be used to obtain distances that involve hidden patches.

In an illustrative implementation of this invention, the linear system for FIG. 5 would be:

$$\begin{bmatrix} 2 & 0 & 0 & 0 \\ 1 & 1 & 0 & 0 \\ 0 & 0 & 2 & 0 \\ 0 & 0 & 1 & 1 \end{bmatrix} \begin{bmatrix} d_{21} \\ d_{24} \\ d_{31} \\ d_{34} \end{bmatrix} = c \begin{bmatrix} O^3_{121} - O^1_1 \\ O^2_{124} - (O^1_1 + O^1_4)/2 \\ O^3_{131} - O^1_3 \\ O^2_{134} - (O^1_1 + O^1_4)/2 \end{bmatrix}$$

Figure 6:
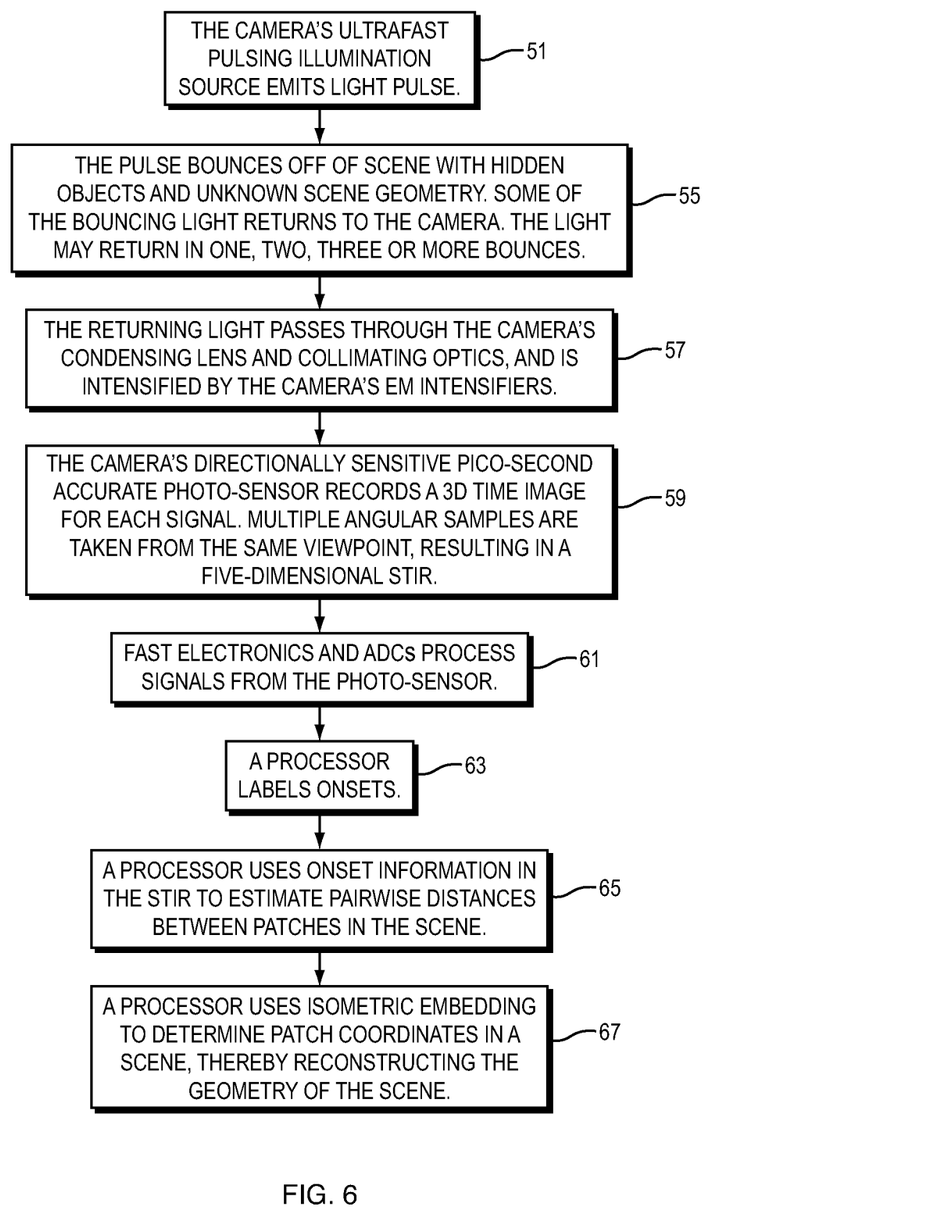
FIG. 6 is a flowchart that shows high-level functionality of a camera system, in an illustrative implementation of this invention.

FIG. 6 is a diagram that illustrates high-level functionality of a camera system, in a working prototype of this invention. The camera's ultrafast pulsing illumination source emits light pulse. 51 The light pulse bounces off of a scene which has hidden objects and unknown scene geometry. Some of the bouncing light returns to the camera. The light may return in one, two, three or more bounces. 55 The returning light passes through the camera's condensing lens and collimating optics, and is intensified by the camera's EM intensifiers. 57 The camera's directionally sensitive pico-second accurate photo-sensor records a 3D time image for each signal. Multiple angular samples are taken from the same viewpoint, resulting in a five-dimensional STIR. 59 Fast electronics and ADCs process signals from the photo-sensor. 61 A processor labels onsets. 63 A processor uses onset information in the STIR to estimate pairwise distances between patches in the scene. 65 A processor uses isometric embedding to determine patch coordinates in a scene, thereby reconstructing the geometry of the scene. 67

The following is a description of some features of a working prototype of this invention: A commercially-available reverse-biased silicon photo sensor (Thorlabs FDS02) is used. This sensor has an active area of 250 microns in diameter and a condensing lens to gather more light. Photo-currents are digitized by a 5 GHz oscilloscope, with a least count of 50 ps (1.5 cm light travel). The ray impulse source is a modelocked Ti-Sapphire laser with a center wavelength of 810 nm, that emits 50 femtosecond long pulses at a repetition rate of 93.68 MHz. The spatial bandwidth of these pulses greatly exceeds the response bandwidth of the sensor. Average laser power is 420 milliwatts, corresponding to a peak power of greater than 85 kW. Two design goals for this prototype were to sample the incident light with picosecond resolution and be highly sensitive to a low photon arrival rate. In this prototype, depth resolution is limited by the response time of the detector and digitizer (250 ps, 7.5 cm light travel). The high peak power of the laser is advantageous for registering SNR above the dark current of the photo sensor. STIR acquisition times for this prototype are in nanoseconds, which allows a large number of exposures to be taken. These exposures may be time averaged to reduce Gaussian noise. This prototype lacks a 2D photo sensor array. However, directionality (which a 2D photo sensor would have provided) is emulated by raster scanning the scene with a steerable laser and sensor. In this prototype, synchronization is achieved by triggering pulses based on a reference photo sensor. A small part of the laser pulse is deflected into a reference photo sensor using a semi-reflective glass patch and all pulse arrivals (onsets) are measured as TDOA with respect to the reference.

In illustrative implementations of this invention, a camera system may be used to estimate geometry for objects that do not reflect any light to camera due to specularity or occlusion.

In traditional cameras it is difficult to estimate the distance to a specular surface because there is no direct reflection received at the camera. According to principles of this invention, however, transient imaging analysis may be used to estimate the distances to specular surfaces by observing indirect bounces.

Figure 7:
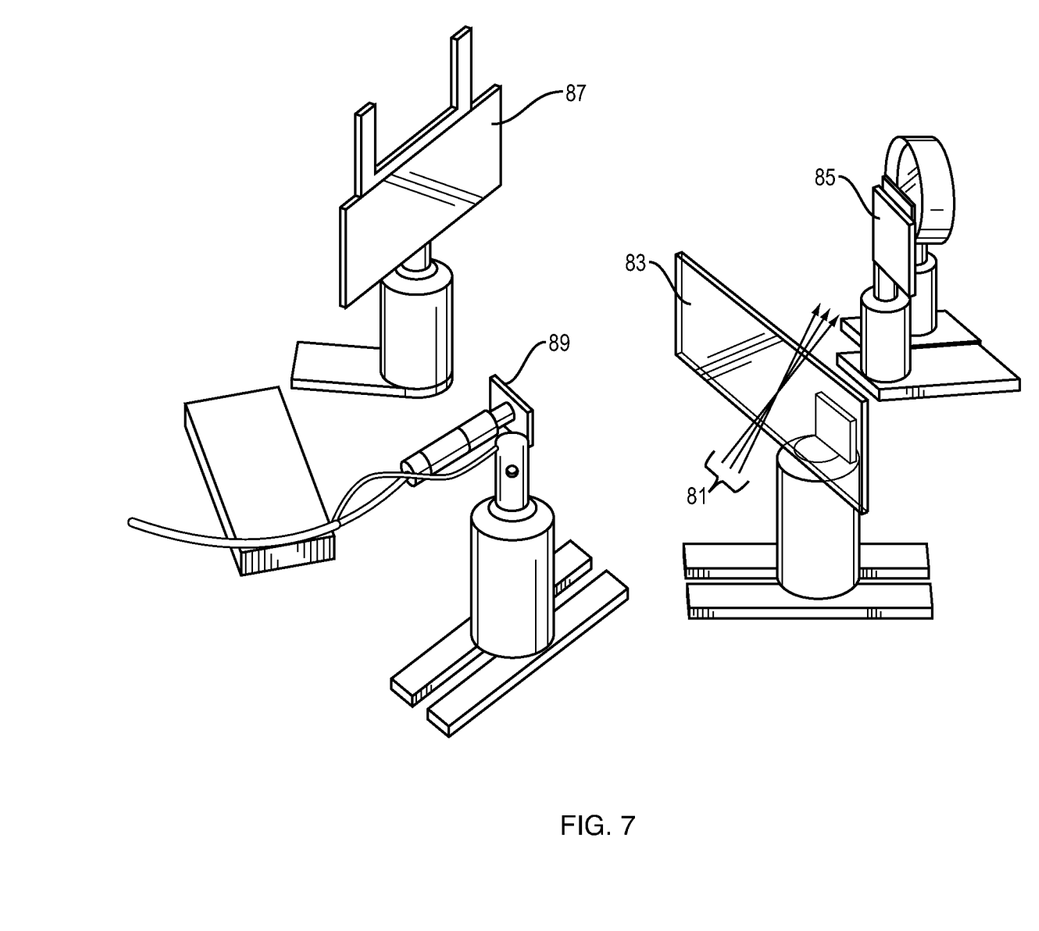
FIG. 7 shows a setup for measuring distances from a camera to a specular surface by observing indirect bounces, in an illustrative implementation of this invention.
Figure 8:
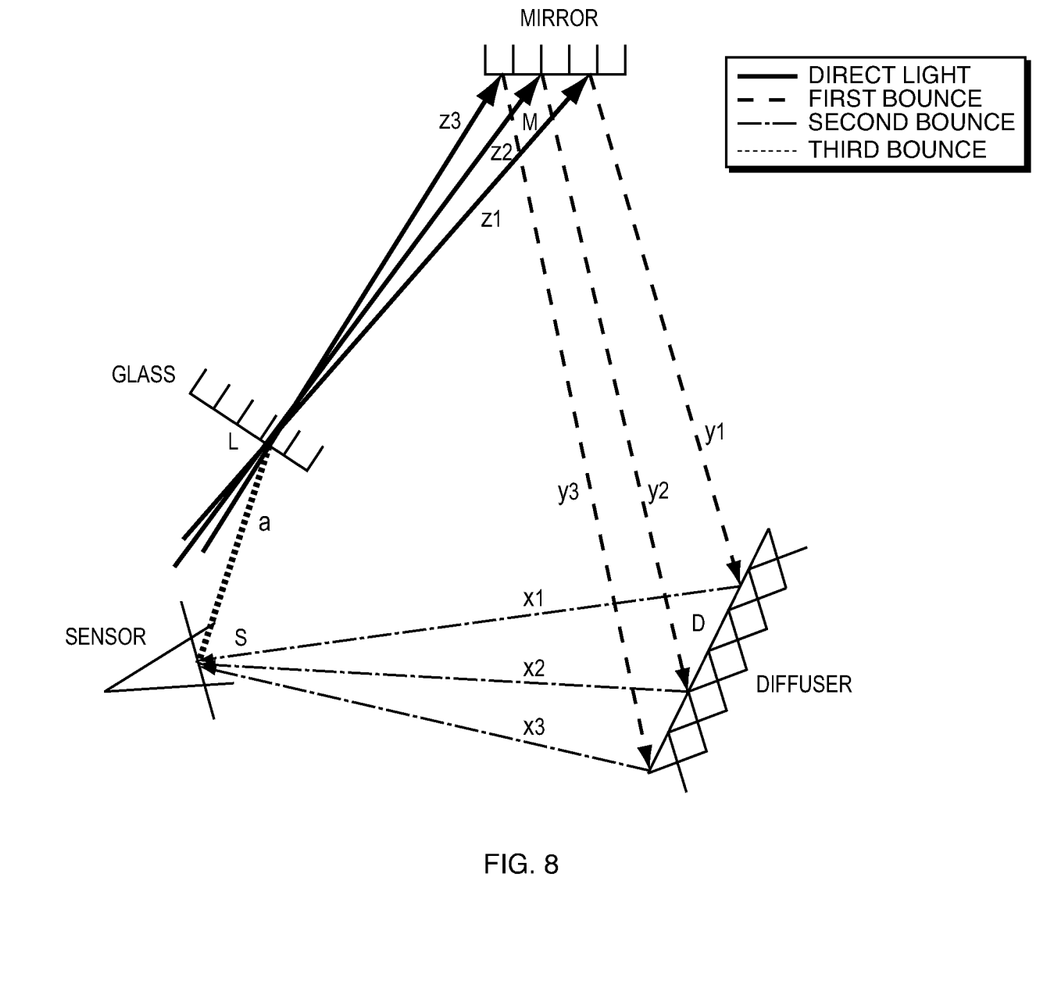
FIG. 8 is a light ray diagram that shows paths that light may follow in that setup.

For example, consider the example shown in FIGS. 7 and 8, in which a direct reflection is missing. In this example, light does not reflect directly to the camera, because it strikes a mirror that causes the light to reflect in another direction.

In FIG. 8, light rays Z1, Z2 and Z3 are emitted by a laser (not shown), as that laser is moved from one position to another. These three light rays, which are pointed in slightly different angles, serve as three angular samples. These three light rays intersect at a point in a piece of semi-reflective glass. This point of intersection emulates the single viewpoint of the camera discussed above. After passing through this glass, light rays Z1, Z2 and Z3 strike the mirror, and then bounce off as light rays y1, y2 and y3. These strike a diffuser, and then bounce off as light rays x1, x2 and x3, which return to the sensor S. Part of the light that strikes the glass reflects (along path a) to the sensor S, and is used as a reference signal.

FIG. 7 depicts the same set-up as FIG. 8. Three light rays 81 are emitted by a laser (not shown) and intersect at a point in a piece of semi-reflective glass 83. The point of intersection of these light rays in the glass emulates the single viewpoint of the camera discussed above. The three light rays are emitted by a laser (not shown) after it is moved into three different positions, respectively. The three light rays act as three angular samples. After passing through the glass 83, these three light rays strike a mirror 85, then bounce toward a diffuser 87, and then bounce toward a sensor 89.

In the example shown in FIGS. 7 and 8, if the laser, L, is pointed towards a mirror (in a known direction) it will strike an unknown point on M. The reflected light will then illuminate points on the diffuser. Separately, the position and the depth of the diffuser, x, is estimated via stereo triangulation (using the known angle of the laser beam) or time of flight. When the laser illuminates M, the total path length sensed at a pixel observing D is (z+y+x). Since x is known, the point M is obtained using conic multilateration. For example, in a test of the setup shown in FIGS. 7 and 8 using a working prototype of this invention, three raster scans were conducted and it was assumed that $z_1=z_2=z_3=z$. The path lengths $z_i+x_i+y_i=1,2,3$ were estimated using TDOA.

Figure 9:
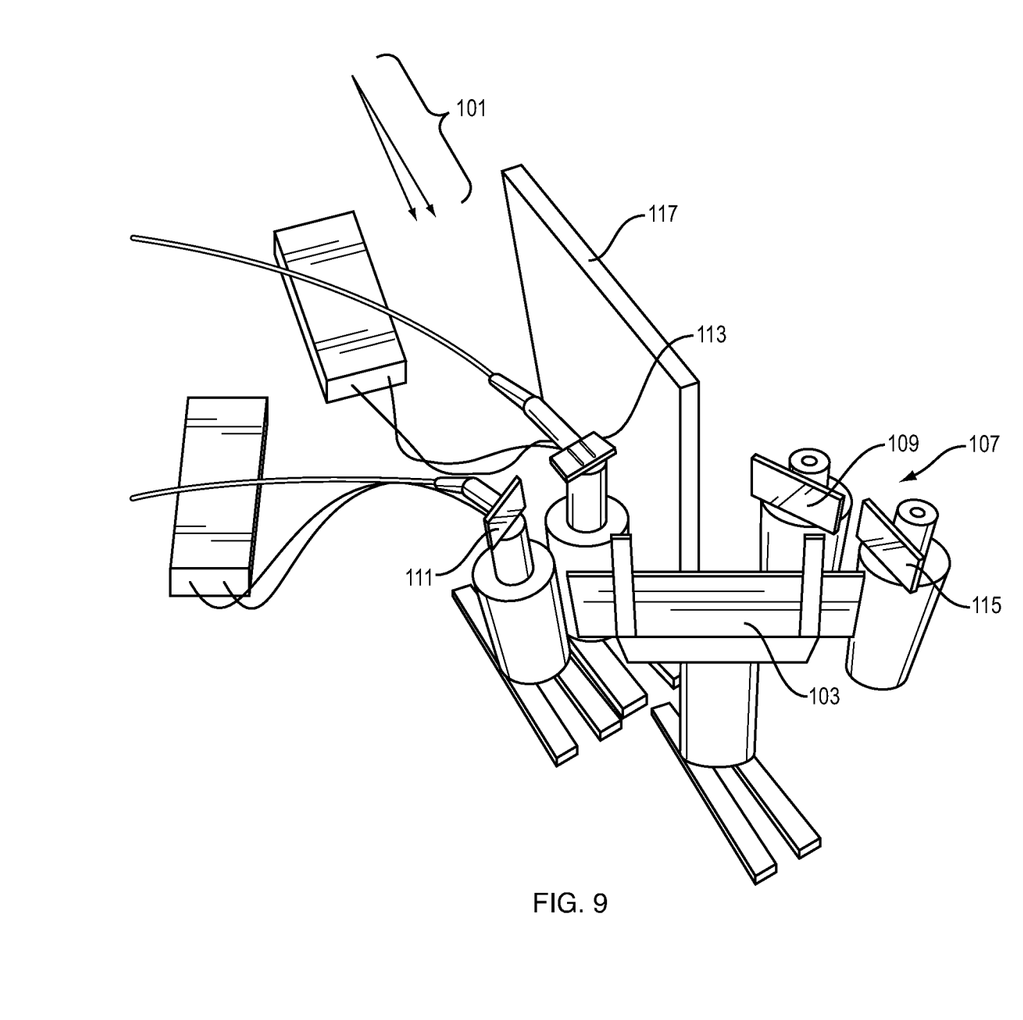
FIG. 9 shows a setup for detecting a pattern that is occluded from direct view of the camera, in an illustrative implementation of this invention.
Figure 10:
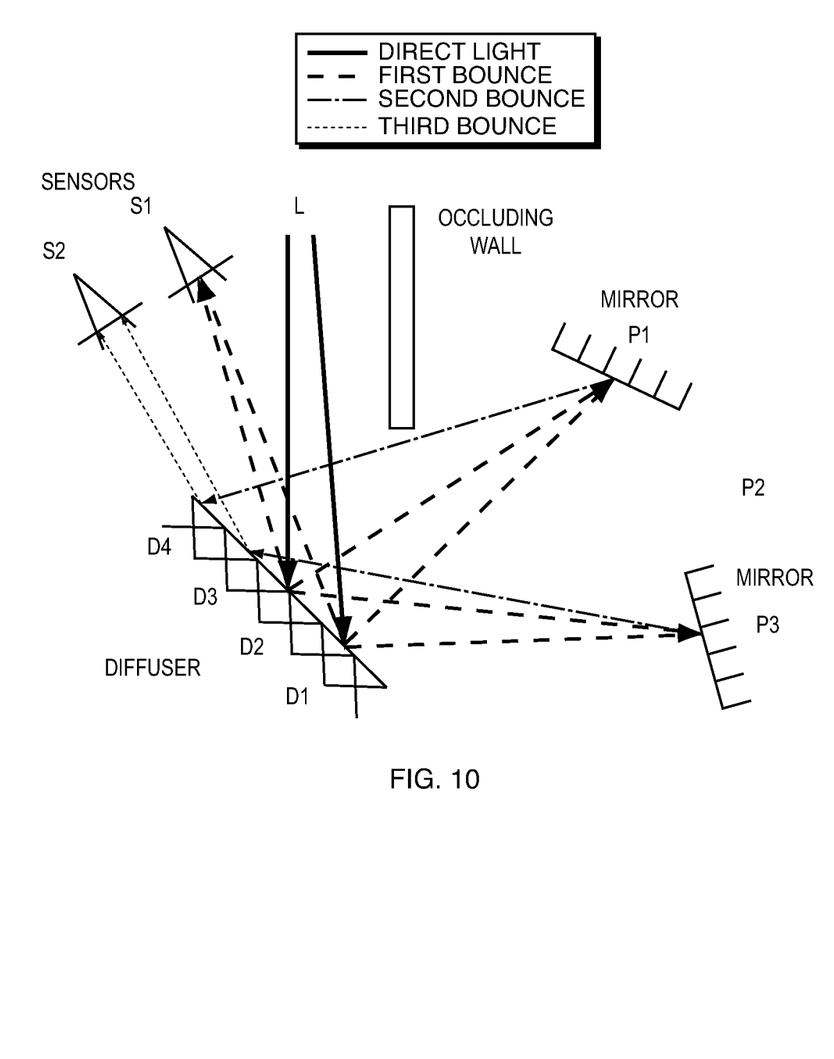
FIG. 10 is a light ray diagram that shows paths that light may follow in that setup.

Also, consider the example shown in FIGS. 9 and 10, in which a direct reflection is missing. In this example, the scene contains patches which are not visible to either the camera or the illumination source, because of occlusion.

As shown in FIG. 9, two light rays 101 from a laser (not shown) point in slightly different directions. They serve as two angular samples. The light rays strike a diffuser 103, then bounce off (first bounce) and strike mirrors 109 and 115, respectively. Then (on a second bounce), they strike the diffuser 103. Then (on a third bounce), they strike sensors 101 and 103, respectively. Mirrors 109 and 115 and empty space 107 emulate a 1-0-1 barcode. This "barcode" is hidden from direct view of the camera by the occluding wall 117. In FIG. 9, one of the sensors is used as a reference.

FIG. 10 has the same setup as FIG. 9.

In a working prototype of this invention, which has been set up to match the optics of FIG. 10, the position of the hidden "barcode" is determined as follows: Only light rays that have first bounced off the diffuser reach the hidden patches $P_1$, $P_2$, $P_3$. Light that is reflected from the hidden patches (second bounce) can only reach the camera once it is reflected off the diffuser again (third bounce). The position and depth of the points on the diffuser is estimated using first bounce onsets. A raster scan is done across the diffuser. The time difference of arrival (TDOA) between the first and third bounce onsets is measured. A hidden 1-0-1 barcode (corresponding to mirror P1, empty space P2 and a mirror P3) is imaged using the first and third bounces off of a single diffuser. Neither the sensors, $S_1$ and $S_2$, nor a femtosecond laser source, L, have the barcode in their line of sight. The patches $P_1$ and $P_3$ are ground mirrors and $P_2$ is free space. The mirrors are aligned to maximize the SNR required for registering a third bounce. The maximum separation between $P_1$ and $P_3$ is limited to 5 cm because of SNR considerations. The first bounce, $LD_1S_1$, is recorded by $S_1$, and the two third bounces from the hidden patches, $LD_1P_1D_4S_2$ and $LD_1P_3D_3S_2$, arrive at $S_2$ within 200 ps of each other. In this prototype, the sensor is not fast enough and can only record the sum of the two third bounces. Alternately, the two bounces can be recorded more accurately with a faster picosecond sensor or separated using deconvolution using $S_2$'s impulse response. In the example shown in FIG. 10, the spatial resolution of the estimate may be improved by blocking $P_1$ and $P_3$, one at a time.

In illustrative embodiments of this invention, the photo sensor may comprise a 2D array of photo sensors (which allows directionality to be measured). Alternately, directionality may be emulated by raster scanning the scene with a steerable laser and sensor. In illustrative embodiments of this invention, the photo sensor and illumination source may be housed in the same device. Alternately, they may be housed in separate devices.

In illustrative embodiments of this invention, computations (including those describe above) are performed by one or more processors. Some or all of these processors may be housed in the same device as the sensor. Alternately some or all of the processors may be housed separately. If housed separately, these processors may be connected to the camera by a wireless or wired link.

In practice, the number of angular samples may be larger than in the simple examples discussed above.

The spatial resolution of the reconstruction may be increased by increasing the number of angular samples taken. For example, if samples are taken at 20 different angles (each angle being specified by a different $(\theta, \phi)$), this yields a higher spatial resolution than if only three different angular samples are taken, other things being equal.

Decreasing the temporal resolution of the photo sensor tends to decrease the spatial resolution of the reconstruction. For example, exposure times in the microsecond range will yield a lower spatial resolution than exposure times in the picosecond range, other things being equal. However, one can compensate for slower temporal resolution by increasing the number of angular samples.

This invention may be used to advantage in many scenarios. For example, this invention may, in some embodiments, be used for scatter-free reconstruction in medical imaging, "seeing into" hidden parts of a structure for fire and rescue personnel, tracking beyond line of sight in surveillance and car collision avoidance at blind corners, and robot path planning with extended observable structure.

As used herein, the terms "light", "illumination" and other words of similar import apply to electromagnetic radiation of any frequency, and are not limited to the visible light range.

This invention may be extended to other signals that are pulsed. For example, this invention may be implemented using sound rather than light waves. In that case, a source of pulsed sound and sensors for detecting sound may be employed.

This invention may be implemented in many different ways. Here are a few examples:

This invention may be implemented as apparatus comprising, in combination: (a) an illumination source for emitting pulses of light toward a scene, (b) a sensor for measuring the intensity of light from said scene, in such a manner that the measured intensity at a pixel of said sensor from a pulse of light varies over time due to different paths that said light travels between said illumination source and said sensor, and said sensor takes said measurements with respect to a plurality of said pulses, which plurality of pulses are not all in the same direction, and for outputting signals indicative of data gathered in said measurements, and (c) one or more processors for processing said data to calculate positions of at least two points in said scene, based, at least in part, on different amounts of time it takes light to travel different paths. Furthermore: (1) said illumination source may be a pulsed laser, (2) said apparatus may be adapted for calculating the position of at least one point in said scene, which point is occluded from direct view of said illumination source and said sensor, (3) said apparatus may be adapted for calculating the distance to a substantially specular surface that does not reflect light directly back to said sensor, (4) said illumination source and said sensor may be housed in the same device, (5) said sensor may be directionally-sensitive, (6) said sensor may comprise an array of photosensors, (7) said sensor may be adapted to be able to take a measurement of light intensity at least as often as once every 50 picoseconds, (8) said sensor may be adapted to be able to take a measurement of light intensity at least as often as once every nanosecond, (9) said data gathered by said sensor may comprise an impulse response, the dimensions of which impulse response relate at least to pixel position, direction of light pulse, and time, (10) said one or more processors may use onset information in said impulse response to calculate pairwise distances between points in said scene, and (11) said one or more processors may employ isometric embedding to calculate the position of at least two points in said scene.

This invention may be implemented as a method comprising the following steps, in combination: (a) emitting a directionally-varying pulsed signal toward an environment, (b) using a sensor to take time samples of the intensity of the signal reflected back directly or indirectly to said sensor from said pulses, and (c) using one or more processors to calculate geometry of said scene, based at least in part on the different amounts of time it takes for a signal to travel different paths. Furthermore: (1) said sensor may measure light intensity at least once every 50 picoseconds, (2) at least one of said processors may use onset information to calculate pairwise distances between points in said scene, and (3) at least one of said processors may use isometric embedding to calculate the position of at least two points in said scene.

This invention may be implemented as a process comprising, in combination: (a) emitting pulses of light toward a scene, (b) using a directionally-sensitive sensor to take a plurality of time samples of light reflecting back from said scene, in such a way as to record a multi-dimensional impulse response, the dimensions of which impulse response relate at least to pixel position, direction of light pulse, and time, (c) using onset information in said impulse response to calculate pairwise distances between points in said scene, and (d) using isometric embedding to calculate the position of at least two points in said scene. Furthermore: (1) said pulses of light may be emitted by a laser, (2) the position of at least one point in said scene may be calculated, which point is occluded from direct view of said sensor, and (3) a time sample may capture changes in light intensity at a pixel as light from a pulse travels back to said pixel over different paths.

CONCLUSION

The methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. Apparatus comprising, in combination,
   an illumination source for emitting pulses of light toward a scene,
   a sensor
     for measuring the intensity of light from said scene, in such a manner that
       the measured intensity at a pixel of said sensor from a pulse of light varies over time due to different paths that said light travels between said illumination source and said sensor, and
       said sensor takes said measurements with respect to a plurality of said pulses, which plurality of pulses are not all in the same direction, and
     for outputting signals indicative of data gathered in said measurements, and
   one or more processors for processing said data to calculate positions of at least two points in said scene, based, at least in part, on different amounts of time it takes light to travel different paths.

2. The apparatus of claim 1, wherein said illumination source is a pulsed laser.

3. The apparatus of claim 1, wherein said apparatus is adapted for calculating the position of at least one point in said scene, which point is occluded from direct view of said illumination source and said sensor.

4. The apparatus of claim 1, wherein said apparatus is adapted for calculating the distance to a substantially specular surface that does not reflect light directly back to said sensor.

5. The apparatus of claim 1, wherein said illumination source and said sensor are housed in the same device.

6. The apparatus of claim 1, wherein said sensor is directionally-sensitive.

7. The apparatus of claim 1, wherein said sensor comprises an array of photosensors.

8. The apparatus of claim 1, wherein said sensor is adapted to be able to take a measurement of light intensity at least as often as once every 50 picoseconds.

9. The apparatus of claim 1, wherein said sensor is adapted to be able to take a measurement of light intensity at least as often as once every nanosecond.

10. The apparatus of claim 1, wherein said data gathered by said sensor comprises an impulse response, the dimensions of which impulse response relate at least to pixel position, direction of light pulse, and time.

11. The apparatus of claim 10, wherein said one or more processors use onset information in said impulse response to calculate pairwise distances between points in said scene.

12. The apparatus of claim 11, wherein said one or more processors employ isometric embedding to calculate the position of at least two points in said scene.

13. A method comprising the following steps, in combination:
   emitting a directionally-varying pulsed signal toward an environment,
   using a sensor to take time samples of the intensity of the signal reflected back directly or indirectly to said sensor from said pulses, and
   using one or more processors to calculate geometry of said scene, based at least in part on the different amounts of time it takes for a signal to travel different paths;
   wherein at least one of said processors uses onset information to calculate pairwise distances between points in said scene, and wherein at least one of said processors uses isometric embedding to calculate the position of at least two points in said scene.

14. The method of claim 13, wherein said sensor measures light intensity at least once every 50 picoseconds.

15. A process comprising, in combination:
   emitting pulses of light toward a scene,
   using a directionally-sensitive sensor to take a plurality of time samples of light reflecting back from said scene, in such a way as to record a multi-dimensional impulse response, the dimensions of which impulse response relate at least to pixel position, direction of light pulse, and time,
   using onset information in said impulse response to calculate pairwise distances between points in said scene, and
   using isometric embedding to calculate the position of at least two points in said scene.

16. The process of claim 15, wherein said pulses of light are emitted by a laser.

17. The process of claim 16, wherein the position of at least one point in said scene is calculated, which point is occluded from direct view of said sensor.

18. The process of claim 15, wherein a time sample captures changes in light intensity at a pixel as light from a pulse travels back to said pixel over different paths.

\* \* \* \* \*